United States Patent [19]

Wallen

[11] 4,431,902

[45] Feb. 14, 1984

[54] PORTABLE HARDBANDER

[75] Inventor: H. Bruce Wallen, Evanston, Wyo.

[73] Assignee: Rocky Mountain Hardbanders, Inc., Vernal, Utah

[21] Appl. No.: 288,880

[22] Filed: Jul. 31, 1981

[51] Int. Cl.³ .......................... B23K 9/12; B23K 9/04
[52] U.S. Cl. ............................ 219/125.12; 219/76.1; 219/76.11; 219/159
[58] Field of Search ................ 219/76.1, 76.11, 76.14, 219/159, 160, 125.1, 125.12, 137.62, 76.14, 133, 125.11

[56] References Cited

U.S. PATENT DOCUMENTS

| | | | |
|---|---|---|---|
| 3,611,541 | 10/1971 | Garret | 219/76.11 X |
| 4,010,346 | 3/1977 | Cecil et al. | 219/125.1 X |
| 4,145,593 | 3/1979 | Merrick et al. | 219/125.11 X |
| 4,243,727 | 1/1981 | Wisler et al. | 219/76.14 X |
| 4,313,046 | 1/1982 | Henry et al. | 219/137.62 |
| 4,314,195 | 2/1982 | Muter | 219/133 X |

Primary Examiner—B. A. Reynolds
Assistant Examiner—Catherine M. Sigda
Attorney, Agent, or Firm—H. Ross Workman; Rick D. Nydegger; Allen R. Jensen

[57] ABSTRACT

An apparatus for applying a band of hardened metal around a portion of a drill collar in accordance with conventional MIG or TIG welding processes. The improved hardbanding system comprises an AC power source coupled to a water cooled, MIG or TIG welding torch assembly. A hydraulic pump is provided, coupled to the AC power source, for independently driving: (1) a mandril assembly for rotating the drill collar workpiece adjacent the torch assembly, (2) an elevation assembly for adjusting the height of the torch assembly and the mandril assembly; and (3) a pair of hydraulic jacks for lifting the drill collars off of standard pipe racks. The entire system is designed for mounting on the bed of a conventional two ton truck such that the system is easily transportable for on-site hardbanding.

30 Claims, 8 Drawing Figures

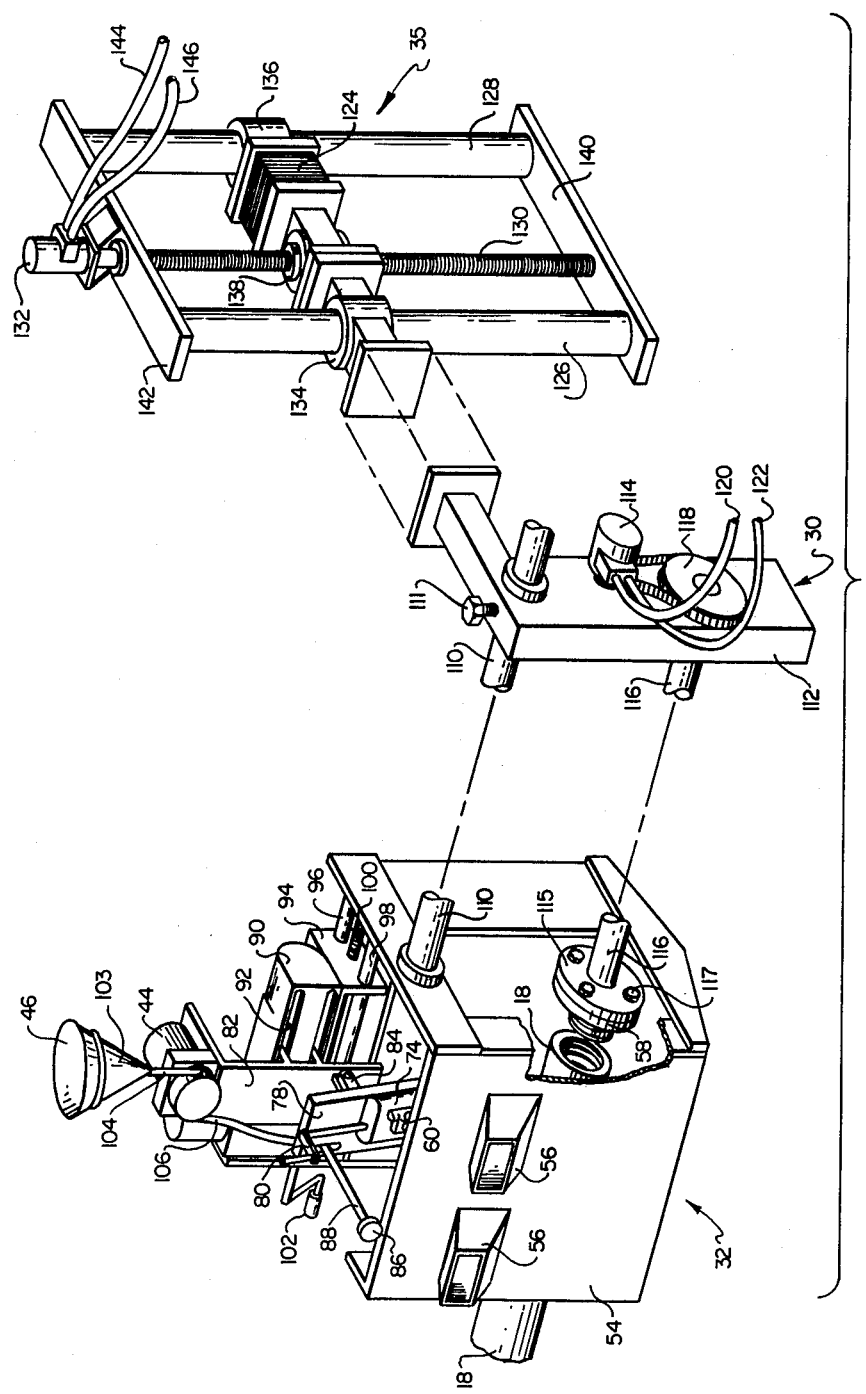

PORTABLE HARDBANDER

BACKGROUND

1. Field of the Invention

The present invention relates to devices and methods for reinforcing drill string components used in drilling operations. More particularly, it relates to a portable apparatus and method for welding a hard metal band onto a portion of a drill pipe or drill collar section.

2. The Prior Art

In the production of wells for the recovery of oil, gas and other natural resources, it is common to utilize rotational drill strings that vary anywhere from several hundred feet to several miles in length. A drill string consists of a plurality of discrete sections that are rigidly connected together as the drill string is advanced into the well. Each discrete section is typically comprised of one of two general section types: drill pipes or drill collars.

A drill pipe consists of an elongated tubular pipe approximately 32 feet in length, having an outer diameter ranging from approximately three and one-half inches to approximatley six and three-quarter inches, and weighing anywhere from 280 to 14,000 lbs. Welded to each end of the elongated tubular pipe are tool joints, the means by which the drill pipe sections are connected together in forming the drill string. Each section of drill pipe has one male tool joint, referred to as the pin end, and one female tool joint referred to as the box end. The pin and box ends are provided with complimentary threaded portions so as to facilitate the rigid joinder of two or more drill pipe sections in forming the drill string.

Drill collars differ from drill pipe in that the threaded male and female tool joints are machined directly into the elongated tubular pipe. Otherwise, drill pipe and drill collars are similar and generally suffer from the same inherent weaknesses. For ease of explanation, therefore, only drill collars will be discussed herein with the understanding that the same considerations generally apply to drill pipe as well, unless otherwise indicated.

In the course of a normal drilling operation, the drill string is subject to substantial frictional wear and significant stress. As a general rule, tool joints are the part of the drill string most susceptible to failure, and the useful lifetime of most drill collars is, therefore, directly dependent on the durability and structural integrity of the tool joints.

In an effort to prolong the useful lifetime of the drill collars, it is common to apply a band of hardened metal (i.e., steel hardened through the use of a tungsten carbide filler) to the outer surface of the drill collar in close proximity to the tool joints. Such hard metal bands (herein referred to as "hardbands") are typically applied to the drill collars according to conventional metal-inert-gas (herein referred to as "MIG") or tungsten-inert-gas (herein referred to as "TIG") welding processes. The use of hardbands has proven to be extremely effective both in retarding the rate of frictional wear at the tool joints and in significantly improving the tool joint's structural strength.

The most effective hardbanding technique presently in use is referred to as "raised face" hardbanding in which the hardbands are welded directly onto the surface of the drill collars so as to present a larger overall diameter than the outer diameter of the drill collar itself. Frictional forces are thus focused at the thicker hardbanded regions during drilling operations such that the hardbands absorb most of the wear rather than the tool joints or the drill collar itself. According to this method, it is possible to extend the lifetime of a drill collar essentially indefinitely by periodically replacing the hardbands as they wear down.

In the past, hardbands were only applied to drill collars at permanent hardbanding facilities, most of which were located at the places where the drill collars were manufactured. This required that the collars be transported large distances and be serviced on a first come first serve basis each time the bands were to be replaced. It will be appreciated that the turn-around time involved in such a procedure required the drilling operator to maintain a substantial inventory of hard-banded drill collars so that the periodic maintenance or replacement of worn drill collars would not necessitate a lengthy and expensive shutdown.

More recently it has become popular to utilize portable hardbanding devices capable of being transported to the drilling location for on-site hardbanding in order to greatly reduce the prohibitive cost of this operation, as well as to essentially eliminate the extensive loss of drill collar use, during the extended period required for sending drill collars to a permanent hardbanding facility.

Although portable hardbanders provide definite advantages over permanent hardbanding facilities, they pose a number of significant problems in design. For example, the size and weight of the equipment which makes up the hardbander must be such that the device can be transported with the least amount of difficulty and expense. However, the safety and efficiency of the system are essentially proportional to the amount of equipment available for materials handling and power generation, respectively. Thus it is desirable to minimize the size and weight of the system to provide for ease in transportation, while still providing the amount and types of equipment necessary for safe and efficient operation. Thus, the optimum design would comprise a portable hardbander that is safe and efficient, and that maximizes the economic benefit to the consumer.

The portable hardbanders found in the prior art represent unsuccessful attempts at meeting these requirements. The prior art devices are generally inadequate in the following areas: (1) the devices are relatively slow in operation, resulting in a higher per unit hardbanding cost; (2) the devices do not provide adequate controls for monitoring the weld content and quality; and (3) the devices are relatively unsafe, resulting in a high incidence of operator injury.

The speed of a hardbander is directly related to the power capability of the system. In a welding process of the type used in hardbanding, electrical current of a very high magnitude is required. The hardbanders found in the prior art generally rely on standard direct current (DC) generators for weld power. Such generators typically produce, at most, 350–450 amps of current. If, however, an alternator were used, alternating current (AC) of 600–700 amps could be produced. Current of this magnitude would significantly increase the speed of the hardbanding process. Moreover, AC equipment provides additional advantages in size and weight since it is inherently lighter and less bulky than DC equipment.

The prior art devices are generally provided with rather crude controls for controlling such things as the welding wire feed rate and the hard metal feed rate. Typically, adjustments of these feed rates are made according to visual inspection and operator estimates. Thus, with these devices, continuous visual observation of the weld by the operator is essential for maintaining the proper feed rates. Moreover, prior art devices do not provide any means beyond operator estimate for making an accurate determination of the weld content. If the weld content is not carefully controlled, the result may be substandard, brittle hardbands which readily crack and break. The prior art devices are, therefore, very susceptible to operator error and do not provide the necessary equipment for adequately controlling hardband quality.

Finally, a serious problem with prior art portable hardbanders is that their operation may be somewhat hazardous to the operator. Most of the prior art portable hardbanders utilize a standard three jaw lathe chuck to rotate the drill collars adjacent to the welding assembly. In most cases, the lathe chuck must be fastened around the drill collars at a point only 2 to 3 inches from the end of the drill collar. As a result of extensive use of the lathe chuck system, it has been found that vibrations and/or slight movement of the collar relative to the lathe chuck can cause a drill collar to work itself free of the lathe chuck and fall to the ground. It will be readily appreciated that an operator working in close proximity to such a device is not in jeopardy of having one of these massive drill collars fall on him, causing a severe injury.

Thus, what is needed in the art is a portable hardbander that is readily and inexpensively transportable, that is safe in operation, that has increased power capability and that provides means for accurately monitoring and controlling the content and quality of the hardbands. Such a device is described and claimed herein.

BRIEF SUMMARY AND OBJECTS OF THE INVENTION

The improved portable hardbander of the present invention provides a device for applying a band of hardened metal around a portion of a drill collar in accordance with conventional MIG or TIG welding processes in a safe, efficient and economical manner.

One embodiment of the improved hardbanding system comprises a AC power source coupled to a water cooled, MIG welding torch assembly. A hydraulic pump is provided, coupled to the AC power source, for independently driving: (1) a mandril assembly for rotating the drill collar workpiece adjacent the torch assembly, (2) an elevation assembly for adjusting the height of the torch assembly and the mandril assembly; and (3) a pair of hydraulic jacks for lifting the drill collars off of standard pipe racks. The entire system is designed for mounting on the bed of a conventional two ton truck such that the system is easily transportable for on-site hardbanding.

It is therefore a primary object of the present invention to provide a portable hardbander that is safe, efficient and economical.

Another important object of the present invention is to provide a portable hardbander that reduces the welding time in a hardbanding operation.

A further object of the present invention is to provide a portable hardbander with which the weld content and quality can be accurately monitored and controlled.

An even further object of the present invention is to provide a portable hardbander that reduces the risk of operator injury.

It is an important object of the present invention to provide a portable hardbander that reduces the possibility of operator error.

A still further object of the present invention is to provide a portable hardbander that derives its weld power from an alternator.

It is still another object of the present invention to provide a portable hardbander having a mandril configurated to rigidly engage a drill pipe or drill collar section.

These and other objects and features of the present invention will become more fully apparent from the following description and appended claims taken in conjunction with the accompanying drawings.

BRIEF DESCRIPTION OF THE DRAWING

FIG. 4 is an exploded perspective view of the torch, mandril and elevation assemblies.

DETAILED DESCRIPTION OF THE PREFERRED EMBODIMENTS

Reference is now made to the drawings wherein like parts are designated with like numerals throughout.

1. THE APPARATUS

Figure 1:
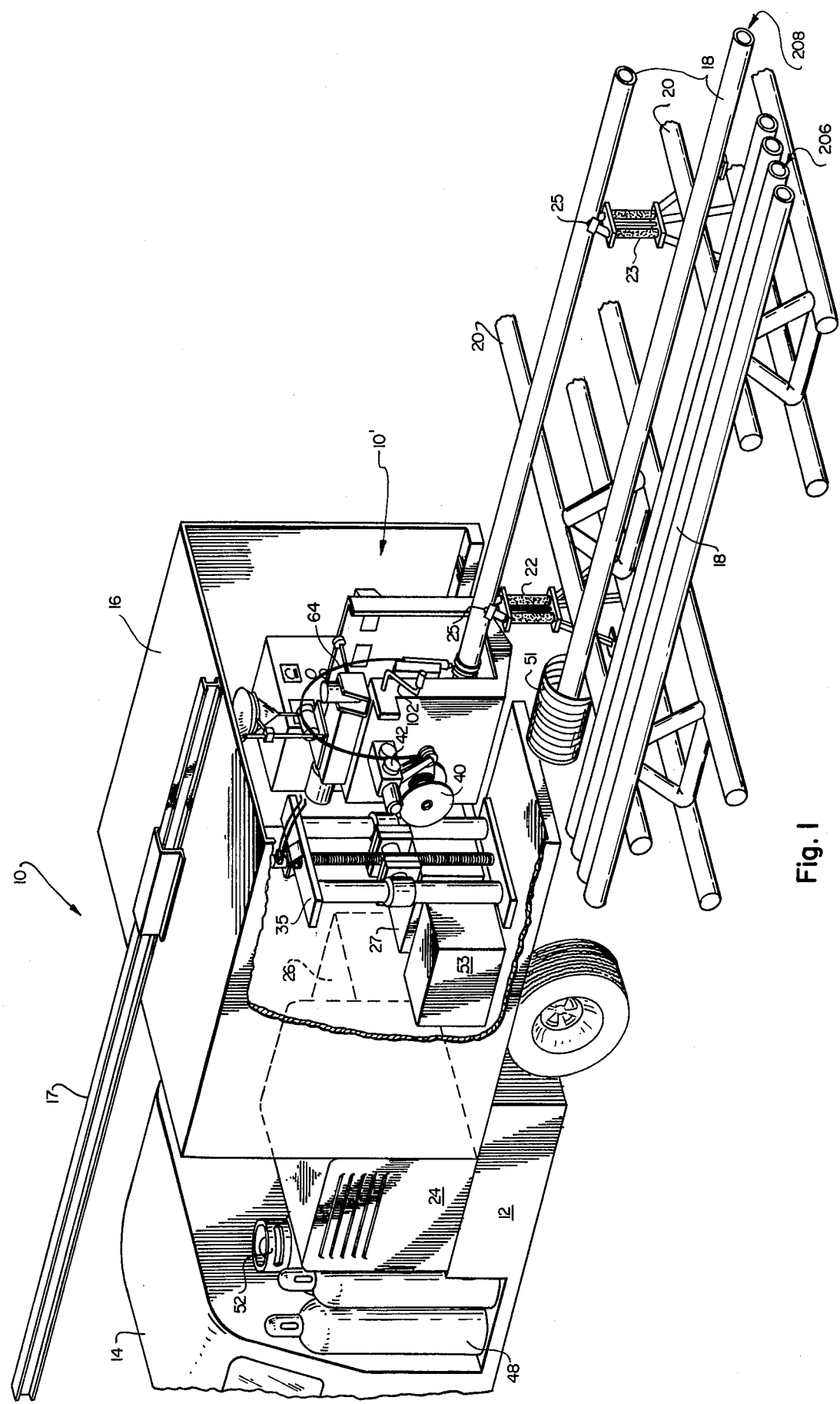
FIG. 1 is a perspective illustration of one presently preferred enbodiment of the portable hardbander of the present invention.

FIG. 1 schematically illustrates the portable hardbander of the present invention generally designated 10. Portable hardbander 10 consists of a two ton truck 12 which has the hardbander 10' mounted on its bed. Hardbander 10' generally consists of a metal-inert-gas welding system and controls therefore (described in more detail below) specially adapted to the task of applying bands of hardened metal to drill collar or drill pipe sections. Truck 12 has a cab 14, a box 16 and a slideable boom 17. Space is provided between cab 14 and box 16 for storage and/or installation of additional welding equipment. Truck 12 has a rear door (not shown) hingedly attached at the top-rear edge of box 16 for protection of the equipment enclosed in box 16 during transportation and storage.

As illustrated in FIG. 1, those drill collars 18 which require hardbanding are typically stored on pipe racks 20 at the site of the drilling operation. As will be hereinafter more fully described, a pair of pipe jacks 22 and 23 are provided for lifting and manipulating drill collars 18 in preparation for, and during the hardbanding operation. Pipe jacks 22 and 23 are topped with transfer balls 25 for supporting the drill collars. Transfer balls 25 enable the drill collars to be rotated and axially translated relative to the pipe jacks.

Figure 2:
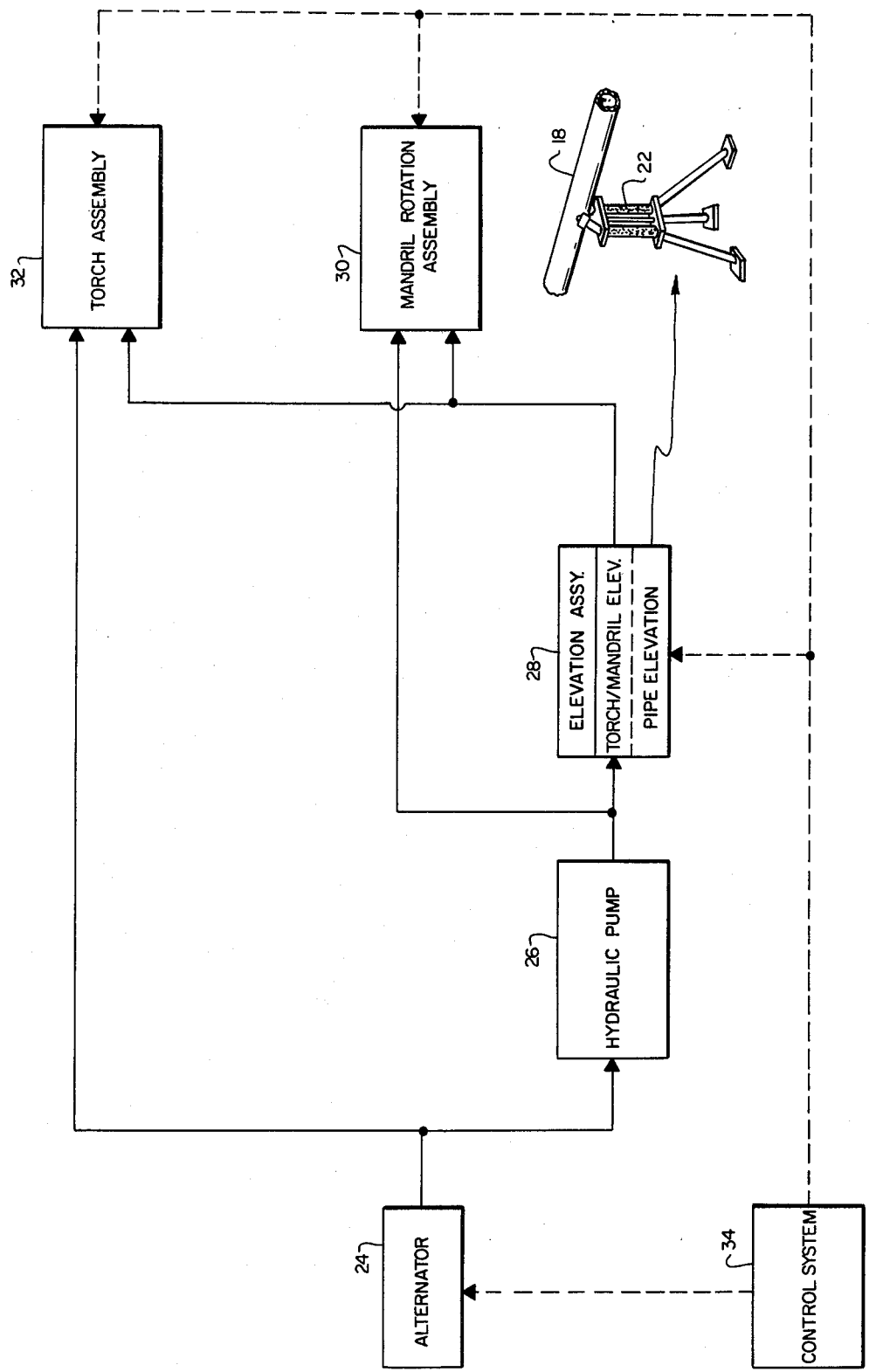
FIG. 2 is a block diagram illustrating the general relationship among the various components of the present invention.

The block diagram of FIG. 2 generally illustrates the way in which the various components of the hardbander 10' are interconnected. As shown in FIG. 2, the hardbander consists basically of six components: an alternator 24; a hydraulic pump 26; and elevation assembly 28; a mandril assembly 30; a torch assembly 32 and a control system 34.

With further reference to FIG. 2, alternator 24 is preferably a diesel driven power generating device which supplies power to torch assembly 32, hydraulic pump 26 and contol system 34. The presently preferred alternator 24 delivers AC rectified master weld power with 600 to 700 amps of current on approximately an 80% duty cycle to torch assembly 32. Any commercially available alternator with comparable performance ratings could be used in accordance with the present invention. Thus, the specific selection of alternator 24 does not constitute, per se, an essential feature of the present invention.

As indicated above, hydraulic pump 26 is coupled to, and derives its power from alternator 24. Hydraulic pump 26 is coupled at its output to, and independently drives, elevation assembly 28 and mandril assembly 30 under the control of control system 34. Hydraulic pump 26 could be provided through the use of a number of commercially available pumps.

Hydraulic pipe jacks 22 and 23 are placed in line with mandril assembly 30, and a drill collar is rolled along pipe racks 20 (FIG. 1) so as to be positioned over pipe jacks 22 and 23. Thereafter, pipe jacks 22 and 23 are extended upward in order to raise the drill collar 18 off of pipe racks 20 and to elevate and axially align the drill collar 18 with the mandril assembly 30. Alternatively, the torch/mandril elevation assembly 35 can be used to adjust the height of mandril assembly 30 to that of drill collar 18. Both the pipe jacks 22, 23, and torch/mandril elevation assembly 28 are coupled to and powered by hydraulic pump 26 under the control of control system 34. When properly aligned, drill collar 18 is securely coupled to mandril assembly 30 (described in more detail below).

With drill collar 18 coupled to mandril assembly 30, the operator can effectuate the rotation of drill collar 18 by mandril assembly 30 through control system 34. Power for rotation is derived from hydraulic pump 26 in response to signals from control system 34. Thereafter, the operator can initiate application of the hardband through control system 34.

The application of the hardband is performed by torch assembly 32 through a conventional MIG welding process. MIG welding is well known in the art, and is well documented in the trade literature (see, for example, American Welding Society, 2 *Welding Handbook* 113—152 (7th ed., W. H. Kearns, 1976). Basically, the MIG process consists of a conventional arc welding process wherein the molten weld pool is shielded from the ambient atmosphere by an inert gas so that the weld metal does not oxidize before it solidifies.

Figure 3:
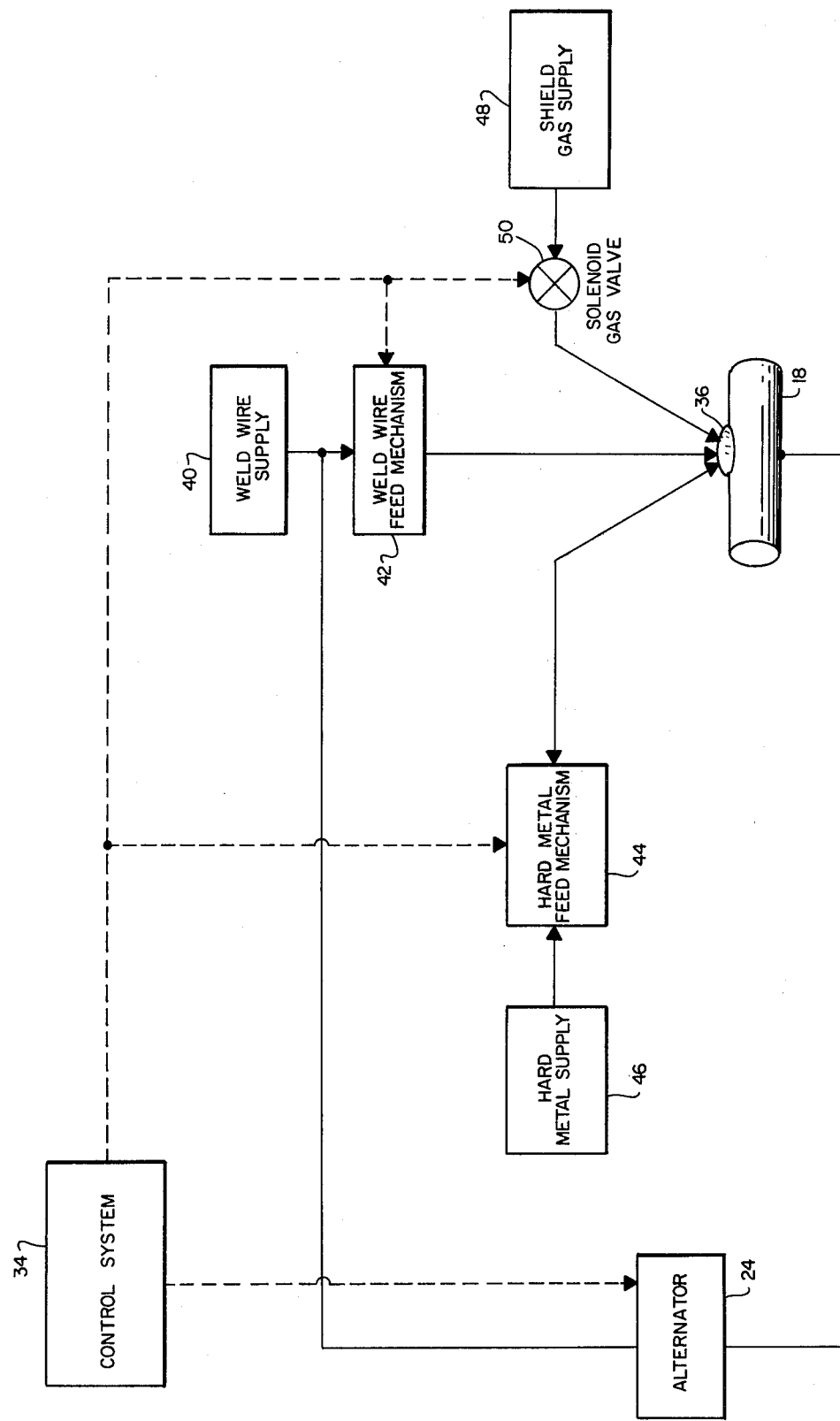
FIG. 3 is a schematic representation in block diagram form of a conventional metal-inert-gas welding system.

The various components associated with the MIG welding process of the present invention are schematically illustrated in FIG. 3. Welding wire is supplied to the weld pool 36 on a workpiece such as drill collar 18 from welding wire supply 40. Wire from supply 40 is advanced into weld pool 36 at an adjustable and essentially constant rate by welding wire feed mechanism 42 which is controlled by control system 34. A hard metal filler, such as tungsten carbide or other suitable metal compound, is added to the weld pool 36 by a hard metal feed mechanism 44 which is controlled by control system 34 and is supplied by a hard metal supply 46. The shield gas is applied to the weld pool from an inert shield gas supply 48. The flow of shield gas from supply 48 is regulated by control system 34 through solenoid gas valve 50.

In accordance with the present invention, an operator simply places the master weld switch of control system 34 in the "on" position to begin application of the hardband onto drill collar 18. As soon as the master weld switch is placed in the "on" position, control system 34 actuates valve 50 so as to set up an inert gas shield around the location at which the weld pool will be formed. After the shield gas has been flowing for a short time (approximately 1–2 seconds), control system 34 automatically activates wire feed mechanism 42 which advances the welding wire from supply 40 toward drill collar 18.

Master weld power is supplied by alternator 24 and, as schematically illustrated, the negative terminal of alternator 24 is electrically coupled to the welding wire, and the positive terminal is electrically coupled to the workpiece 38. Thus, the circuit will be completed the instant the weld wire makes contact with workpiece 38, thereby passing approximately 600 to 700 amps of current and setting up an arc. A short time after the arc is struck and a molten weld pool 36 is formed, control system 34 automatically actuates hard metal feed mechanism 44 which feeds hard metal from supply 46 to the molten weld pool 36.

Control system 34 provides controls (more fully described below) for adjusting the feed rates of feed mechanisms 42 and 44 and the flow of the shield gas from supply 48. In addition to being adjustable, these controls can be calibrated so that the operator is able to accurately monitor and control the weld content and quality throughout the hardband deposition process.

When the weld is complete, the operator simply moves the master weld switch to the "off" position, and control system 34 automatically shuts down feed mechanisms 42 and 44 thereby creating an open circuit which stops the arc. The shield gas from supply 48 continues to flow for approximately 2 seconds (until the weld pool 36 solidifies), after which control system 34 automatically closes valve 50.

With particular reference to FIG. 1, alternator 24 is rigidly mounted to the bed of truck 12 in the space between cab 14 and box 16. Alternator 24 is preferably a Model 55-D Trailblazer welder power plant manufactured by Miller Electric Co. Inc. The Miller Trailblazer is a diesel-driven power generator which produces an AC voltage of 110 volts, and produces a rectified weld voltage which can be varied from approximately 18 to approximately 54 volts. The various components of hardbander 10' requiring electrical power are electrically coupled to, and derive power from the 110 Vac output of alternator 24. The weld voltage output of the Trailblazer is capable of providing a very high magnitude of current for welding purposes. For example, in a typical hardbanding operation, it is not uncommon for the alternator to provide from approximately 600 to approximately 700 amps of AC rectified current on approximately an 80% duty cycle for welding purposes. This high magnitude of current represents a significant advantage over hardbanders found in the prior art which utilize DC generators for master weld power. In addition, the use of an AC rectified power source together with the MIG welding process enables better control of the depth of penetration and the spreading of the weld.

Also situated between cab 14 and box 16 are hydraulic pump 26, shield gas supply 48 and gas cylinder 52. As schematically illustrated in FIG. 1, hydraulic pump 26 is positioned adjacent alternator 24. Hydraulic pump 26 is preferably a Vickers single stage vane Model SSG 14, and is shaft driven by the diesel engine of alternator 24. Hydraulic pump 26 is coupled to control system 34 through conventional hydraulic fluid lines (not shown) for providing hydraulic power to each component of hardbander 10' which requires such power. For example, hydraulic pump 26 supplies power to elevation assembly 28 and mandril assembly 30 through control system 34. Coupled to hydraulic pump 26 is a hydraulic fluid reservoir schematically illustrated at 27.

Shield gas supply 48 typically includes one or more gas cylinders which supply a suitable inert gas, such as argon, to the torch assembly 32 through conventional gas lines (not shown). The flow of shield gas from supply 48 to torch assembly 32 is regulated by control system 34 through the use of a conventional solenoid gas valve (not shown).

Gas cylinder 52 is coupled to heater 56 through conventional gas lines (not shown), and supplies heater 51 with a combustible gas, such as propane, for preheating the drill collars 18 just prior to hardband application.

With further reference to FIG. 1, situated inside box 16 are mandril assembly 30, torch assembly 32, control system 34, torch/mandril elevation assembly 58, hydraulic fluid reservoir 27, and a heat exchanger for torch assembly 32 schematically illustrated at 53.

Heat exchanger 53 is coupled to torch assembly 32 through conventional fluid lines (not shown), and provides an essentially continuous flow of water through torch assembly 32 for purposes of dissipating heat from torch assembly 32 during the hardbanding process. Heat exchanger 53 preferably includes a water reservoir tank and an electric pump which derives its power from alternator 24.

Reference is next made to FIG. 4 wherein the torch assembly, the mandril assembly and the torch/mandril elevation assembly are illustrated in more detail, and are generally designated at 32, 30 and 35, respectively. Torch assembly 32 includes a housing 54 which has conventional view ports 56 provided with protective glass for observing the hardband application. Housing 54 has openings in the front and in the rear through which the drill collars may extend in order to engage mandril 58.

Figure 5:
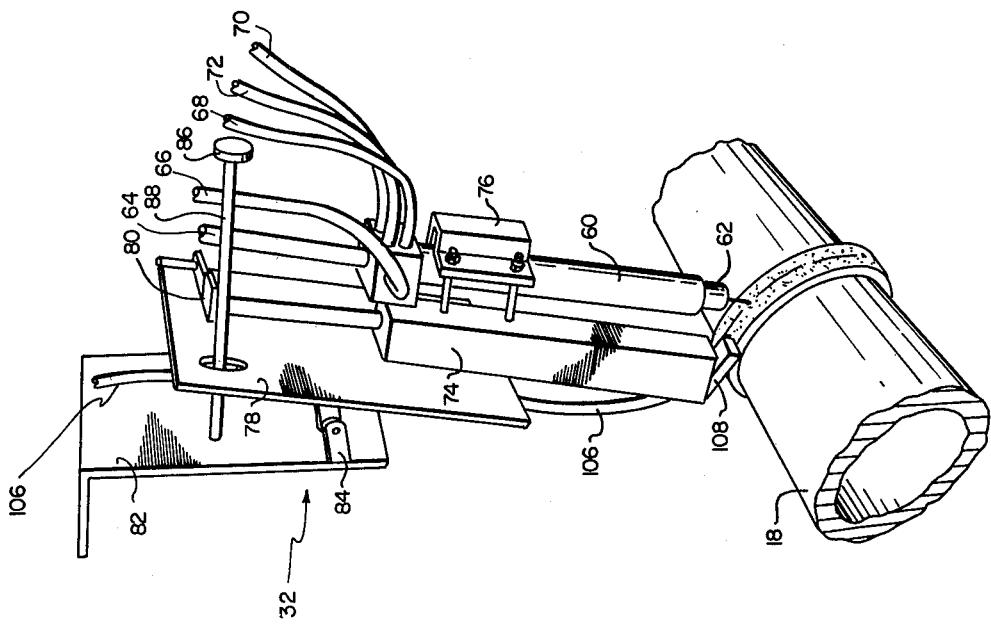
FIG. 5 is a detailed perspective view of the welding torch and supporting structure therefore.

Referring to FIGS. 4 and 5, torch assembly 32 includes a conventional MIG welding torch 60 which is positioned within housing 54 such that the distal end 62 of torch 60 is adjacent drill collar 18.

Torch 60 is coupled to welding wire feed mechanism (see FIG. 1) through a flexible conduit 64 for receiving a supply of welding wire. The welding wire from conduit 64 extends through torch 60 and protrudes from the distal end 62 of torch 60 as illustrated in FIG. 5. The welding wire within torch 68 is electrically coupled to the negative terminal of the weld power output of alternator 24 through conductor 66 and through control system 34. During a welding operation, the welding wire extending beyond the distal end 62 of torch 60 acts as the negative electrode of the welder.

Torch 60 is coupled to heat exchanger 53 (see FIG. 1) through conventional fluid lines 68 and 70 for dissipating heat by circulating water through torch 60. Torch 60 is also coupled to shield gas supply 48 (see FIG. 1) through a conventional gas line 72. During a welding operation the incoming gas from line 72 is channeled through torch 60 and is expelled through an opening in the distal end 62 so as to shield the weld pool from the ambient atmosphere.

Torch 60 is rigidly mounted to a sliding block 74 through the use of bracket 76. Sliding block 74 is slidably mounted to plate 78 and provides for essentially vertical displacement of torch 60 so that the placement of torch 60 can be adjusted to accommodate various sizes of drill collars. The vertical placement of torch 60 is adjusted by rotating crank 80 which includes a threaded portion (not shown) upon which sliding block 74 is carried. Thus, by rotating crank 80, torch 60 is carried on sliding block 74 either toward or away from drill collar 18, depending upon the direction of rotation. It will, of course, be apparent that rotation of crank 80 could be accomplished through the use of a motor under the control of control system 34.

In utilizing rectified AC weld power, it is sometimes difficult to obtain a stable arc. One of the key factors in arc stabilization is the angle of the torch relative to drill collar 18. Typically, an angle of approximately nine degrees from the vertical will produce a stable arc. However, conditions may arise which require the angle of the torch to be adjusted in order to obtain a stable arc. Accordingly, torch assembly 32 (FIG. 5) provides a means for adjusting the angle of torch 60 relative to the drill collar.

In accomplishing this, plate 78 is hingedly coupled to bracket 82 so that plate 78 is pivotable about hinge 84, whereby the angle of torch 60 can be adjusted. The pivoting is accomplished by rotating knob 86 which is integrally attached to rod 88. Rod 88 includes a threaded portion which engages a complmentary threaded portion in plate 78. Rod 88 extends through plate 78 and is coupled to bracket 82. Thus, by rotating rod 88, the upper portion of plate 78 is carried on the threaded portion of rod 88, which causes plate 78 to rotate about hinge 84, thereby adjusting the angle of torch 60 relative to the workpiece.

Bracket 82 is rigidly coupled to an oscillator 90 which is essentially an electro-mechanical position control system which can be used to adjust the position of torch 60 along a linear glide path 92 of approximately 5 inches in length, and which can be used to translate the torch 60 back and forth in an oscillatory manner along glide path 92. Oscillator 90 is preferably a commercially available solid state oscillator manufactured by Linde (a division of U.S. Steel). As more fully described hereinafter, oscillator 90 is used to oscillate torch 60 during the application of the hardband so as to produce hardbands with a width of approximately one inch.

Oscillator 90 is carried on a carriage 94 which is supported on guide rods 96 and 98 and continuous screw 100. Carriage 94 can be used to position torch 60 along a linear path of approximately 28 inches in length. The position of carriage 94 can be adjusted by rotating handle 102 which is rigidly coupled to continuous screw 100. It will, of course, be apparent that screw 100 could alternatively be driven by an electric motor under the control of control system 34. Through the use of oscillator 90 and carriage 94, torch 60 can be positioned at any point along drill collar 18 within housing 54 for application of a hardband.

Carried atop bracket 82 is hard metal feed mechanism 44 and hard metal supply 46. Hard metal feed mechanism 44 is preferably a conventional metal feed device manufactured by Tapco, model EM 5. The hard metal feed mechanism is provided with its own controls which, in accordance with the present invention, are integrated into control system 34. Hard metal filler, such as pulvarized tungsten carbide, is stored in hard metal supply 46 which comprises a funnel shaped reservoir. The metal filler from supply 46 falls under the influence of gravity through conduit 104 and is input into feed mechanism 44. Feed mechanism 44 comprises a motor which is controlled by control system 34 and which transfers the hard metal from its input to its output at a constant and adjustable rate. The metal at the output of feed mechanism 44 falls through conduit 106 and is delivered to the weld pool through outlet tube 108 as illustrated in FIG. 5.

Welding wire is supplied to torch 60 from welding wire supply 40 by welding wire feed mechanism 42 (see FIG. 1). Welding wire feed mechanism 42 is preferably a conventional wire feed device manufactured by Linde, model SEH-3. In accordance with the present invention, the controls of welding wire feed mechanism 42 are integrated into control system 34.

Welding wire supply 40 typically consists of a spool of welding wire which is forced through flexible conduit 64 by feed mechanism 42. Feed mechanism 42 comprises a motor that rotates a pair of rollers through which the welding wire from supply 40 is forced. Feed mechanism 42 is controlled by control system 34 and feeds welding wire to torch 60 through conduit 64 at an essentially constant and adjustable rate.

Significantly, weld content and quality may be accurately monitored and controlled since the operator may determine and/or adjust the feed rates of feed mechanisms 42 and 44 through control system 34.

With further reference to FIG. 4, it is seen that the entire torch assembly 32 is supported by, and is coupled to mandril assembly 30 by a solid metal shaft 110. Shaft 110 is rigidly coupled to mandril assembly 30 through the use of tie down bolt 111. As more fully described hereinafter, shaft 110 can be uncoupled from the mandril assembly 30 by loosening bolt 111, and by translating the torch assembly 32 away from mandril assembly 30 thereby withdrawing shaft 110 from mandril assembly 30.

Figure 6:
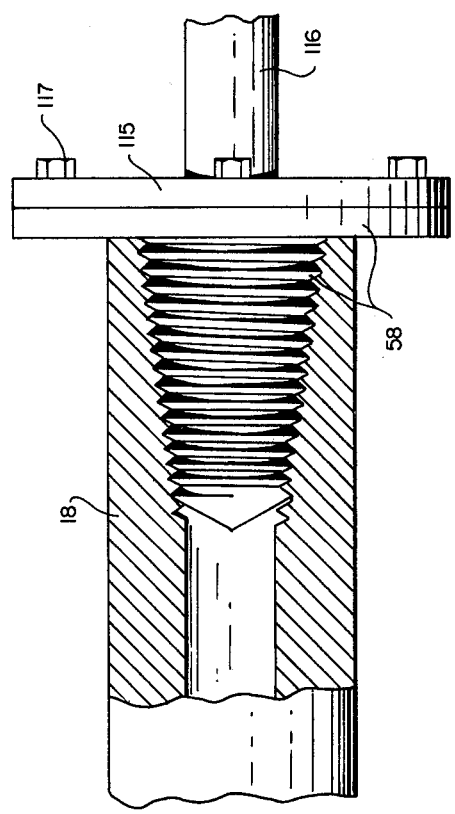
FIG. 6 is a detailed sectional view illustrating the joinders of the box end of a drill collar and one of the interchangeable mandrils of the present invention.
Figure 7:
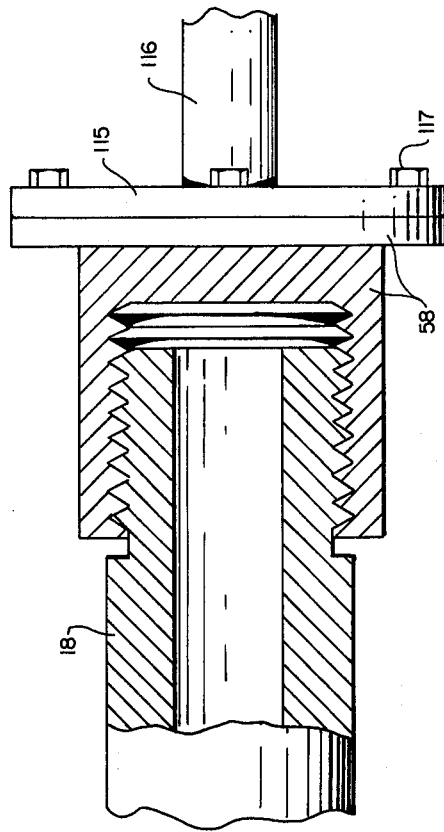
FIG. 7 is a detailed sectional view illustrating the joinder of the pin end of a drill collar and another of the interchangeable mandrils of the present invention.

Mandril assembly 30 consists of essentially three components: a mandril 58, a yoke 112 and a mandril drive motor 114. Each drill collar requiring maintenance is rigidly coupled to mandril 58 which rotates the drill collar adjacent torch 60 for application of the hardband. So that different sizes of drill collars may be serviced by the same hardbander, and so that the same hardbander may be used to apply hardbands to both ends of a drill collar (both the box end and the pin end), a plurality of interchangeable mandrils 58 are provided which rigidly engage face plate 115 which is integrally attached to drive shaft 116. These interchangeable mandrils are preferably coupled to face plate 115 through the use of a series of bolts 117 and hardened metal locating pins (not shown). Each mandril is designed for use with a specific size of drill pipe and engages a specific end. If, for example, the box end of a drill collar were to be hardbanded, a mandril with a complementary male threaded portion of the proper dimensions would be rigidly coupled to face plate 115, and the drill collar would be rigidly coupled to the mandril as illustrated in FIG. 6. If, however, the pin end of a drill collar were to be hardbanded, a mandril with a complimentary female threaded portion of the proper dimensions would be coupled to face plate 115, and the drill collar would be rigidly coupled to the mandril as illustrated in FIG. 7.

The use of a mandril for rigidly engaging the tool joints of the drill collars in mating relationship represents a significant improvement in the art. For example, during the hardbanding operation, the mandril is rotated in a direction so as to force the threaded portion of the mandril to further engage the threaded portion of the drill collar. It will therefore be apparent that neither slight movement of the drill collar with respect to the mandril nor normal vibration of the drill collar would be sufficient to cause the drill collar to work itself free of the mandril, since the mandril is continuously rotated into engagement with the drill collar.

With further reference to FIG. 4, a shaft 116 extends through, and is supported by yoke 112. Coupled to the end of shaft 116 is a gear 118 which is chain driven by mandril drive motor 114. Motor 114 is supported by yoke 112, and is preferably a conventional hydraulic motor manufactured by Charlyn Inc., model 66. Motor 114 is coupled to a hydraulic power source through hydraulic fluid lines 120 and 122. In the preferred embodiment, lines 120 and 122 are coupled to the hydraulic controls of control system 34 to receive hydraulic power derived from hydraulic pump 26 (see FIG. 1).

As described above, drill collar 18 and mandril 58 must be elevated to essentially the same level in order to facilitate joinder thereof. Drill collar 18 can be elevated through the use of pipe jacks 22 and 23 (see FIG. 1). Typically, however, it is also necessary to adjust the height of mandril 58 in order to couple the drill collar to the mandril. With further reference to FIG. 4, this is accomplished through the use of torch/mandril elevation assembly 35 which includes support arm 124, guide posts 126 and 128, continuous screw 130 and hydraulic motor 132. One end of support arm 124 is rigidly attached to yoke 112. Support arm 124 includes a pair of annular fittings 134 and 136 which receive guide posts 126 and 128, respectively, in mating relationship. Support arm 124 also includes a threaded annular fitting 138 which receives continuous screw 130 in mating relationship. Rigidly attached to the ends of guide posts 126 and 128 are base plate 140 and top plate 142. Bearing surfaces (not shown) are provided at the locations where continuous screw 130 engages base and top plates 140 and 142, respectively. A portion of continuous screw 130 extends through top plate 142 and is coupled to motor 132.

Hydraulic motor 132 is supported by top plate 142, and is preferably a conventional hydraulic motor manufactured by Charlyn Inc., model 66 which receives hydraulic power via hydraulic fluid lines 144 and 146. In the preferred embodiment, lines 144 and 146 are coupled to the hydraulic controls of control system 34 to receive hydraulic power derived from hydraulic pump 26 (see FIG. 1).

By operating the hydraulic controls of control system 34 hydraulic power is transmitted through lines 144 and 146 so as to cause hydraulic motor 132 to rotate continuous screw 130, thereby raising or lowering (depending upon the direction of rotation) support arm 124, mandril assembly 30 and torch assembly 32.

Figure 8:
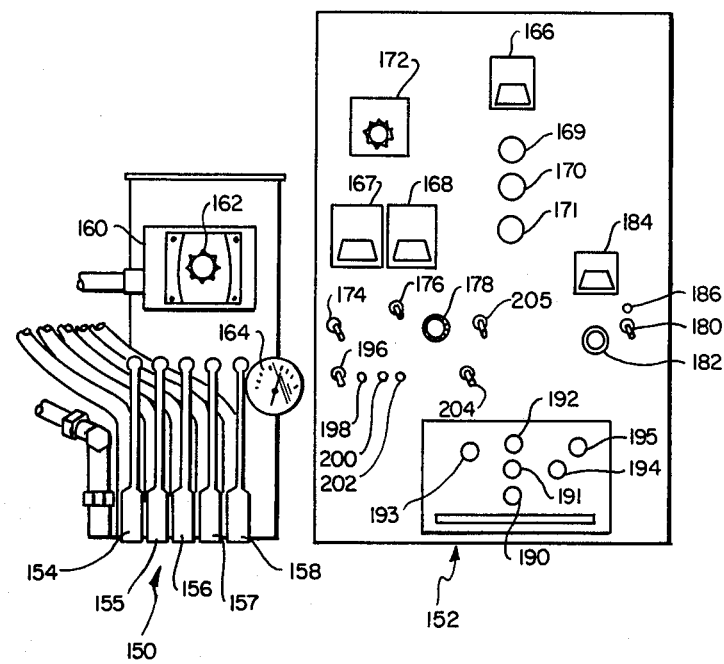
FIG. 8 is a plan view of the hydraulic and electrical controls of the control system of the present invention.

Referring to FIG. 8 it is seen that control system 34 includes a hydraulic control system 150 and an electrical control panel 152. Control of the various components requiring hydraulic power is accomplished through the conventional hydraulic control system 150 which includes hydraulic controls 154–158. The hydraulic control system 150 includes a power line manifold (not shown) which is coupled to hydraulic pump 26 (see FIG. 1). If all of the hydraulic controls 154–158 are in the off position, hydraulic fluid delivered to the power line manifold circulates through a return line manifold (not shown) and returns to the hydraulic fluid reservoir 27 (see FIG. 1). If, however, one of the hydraulic controls 154–158 is actuated, the hydraulic fluid is delivered to the actuated device from the power line manifold, and is returned from the actuated device to the return line manifold through conventional hydraulic fluid lines.

Hydraulic control 154 is coupled to the mandril drive motor 114 (see FIG. 4) and is preferably a two-way hydraulic control valve with detent. By operating control 154, the mandril drive motor may be rotated in either direction, depending upon the position of control 154. The return line from motor 114 is coupled to the return manifold through a flow control and check valve device 160 with which the speed of rotation of motor 114 can be controlled and adjusted through the use of speed adjustment knob 162. Flow control and check valve 160 is also provided with a pressure gauge 164 for monitoring the pressure of the hydraulic fluid delivered to the mandril drive motor. Pressure gauge 164 may also be used to adjust the speed at which mandril drive motor 114 will rotate the mandril and the drill collar. Typically, flow control and check valve 160 is adjusted through the use of adjustment knob 162 to operate at approximately 350 PSI which drives motor 114 at a speed of approximately 1.25 RPM.

Hydraulic control 155 is also coupled to the mandril drive motor 114, and is preferably an on-off momentary hydraulic control valve. Hydraulic control 155 is provided for high speed rotation of mandril drive motor 114. The return line associated with hydraulic control 155 bypasses flow control and check valve 160, and is coupled directly to the return manifold. Thus, maximum pressure is coupled to drive motor 114 through control 155 for momentary, high speed rotation.

Hydraulic controls 156 and 157 are coupled to hydraulic jacks 22 and 23 (see FIG. 1), respectively, through conventional fluid lines. Controls 156 and 157 are preferably two-way momentary hydraulic control valves for controlling the operation of jacks 22 and 23.

Hydraulic control 158 is coupled through conventional hydraulic fluid lines to motor 132 on the torch/mandril elevation assembly 35 (see FIG. 4). Hydraulic control 158 is preferably a two-way momentary hydraulic control valve for rotating motor 132 in either direction, depending upon the position of control 158.

With further reference to FIG. 8, the electrical control panel 152 includes a plurality of gauges, knobs and switches which monitor and control several of the devices discussed above. For example, gauges 166–171 are gauges with which alternator 24 conventionally comes equipped for monitoring the operating conditions of the alternator and the diesel engine. Gauges 166–171 are typically mounted directly on the alternator itself, however, they have been relocated on panel 138 of this embodiment so as to provide a single control panel from which an operator can control the entire system. Gauge 166 monitors the 110 Vac line voltage of the alternator, and gauges 167 and 168 monitor the rectified weld voltage and current, respectively. Gauges 169–171 monitor the water temperature, the oil pressure and the battery charge, respectively, of the diesel engine of alternator 24. The rectified weld voltage can be adjusted from approximately 18 volts to approximately 54 volts through a 75 ohm, wire wound potentiometer 172.

Control of wire feed mechanism 42 is accomplished through momentary toggle switches 174, 176 and feed rate adjustment knob 178. Switches 174 and 176 are provided to enable manual operation of wire feed mechanism 42. In certain instances, the placement of the hardband is very critical. To position the hardband accurately, switch 174 is used to actuate feed mechanism 42 and thereby feed the wire through torch 60 (see FIG. 5) until the end of the wire almost touches the drill collar. In so doing, the exact location of the weld can be determined and the position of torch 60 adjusted accordingly without striking an arc. Switch 176 is provided to manually actuate the wire feed mechanism in reverse thereby causing the welding wire to retract into the torch.

As discussed above, wire feed mechanism 42 is also actuated automatically during the application of a hardband. In accordance with the present invention, wire feed mechanism 42 is also coupled to a conventional, solid state timer (not shown) which is contained inside control panel 152. Whether actuated manually or automatically, the feed rate of wire feed mechanism 42 can be adjusted through feed rate adjustment knob 178. Rate adjustment knob 178 is calibrated in units of inches per minute and can be varied from approximately 0 to approximately 800 inches per minute.

Controls for hard metal feed mechanism 44 are provided through the use of toggle switch 180, feed rate adjustment knob 182 and gauge 184. Switch 180 is provided to enable manual activation of hard metal feed mechanism 44. Hard metal feed mechanism 44 is also coupled to the solid state timer discussed above, and is automatically actuated by the timer during the application of a hardband. The feed rate of hard metal feed mechanism 44 can be adjusted through knob 182 which is calibrated in units of ounces per minute, and can be varied from approximately 0 to approximately 28 ounces per minute. The feed rate of feed mechanism 44 is monitored and displayed through gauge 184. An indicator lamp 186 is provided to give visual verification whenever feed mechanism 44 is actuated, whether actuated manually or by the solid state timer.

The controls for oscillator 90 are preferably integrated into control panel 152 for easy access. Knobs 190–195 are provided for adjusting the various functions of oscillator 90. For example, knob 190 adjusts the center position (i.e., the position about which oscillator 90 oscillates) of oscillator 90. Knob 191 adjusts the rate at which oscillator 90 oscillates, and knob 192 adjusts the width of the excursion of oscillator 90. Through knob 192 the width of oscillation can be varied from zero to approximately five inches. In accordance with the present invention, width adjustment knob 192 is preferably positioned such that oscillator 90 moves torch 60 back and forth during the application of a hardband so as to produce a hardband of approximately one inch in width.

After the completion of one entire hardband, knob 190 is manually adjusted so as to move the center point of oscillator 90 approximately one inch so as to produce a second hardband which abuts directly against the first, completed hardband, and so on until the desired number of hardbands are completed.

Knobs 193 and 194 cause the oscillator to pause at the two extremes of the oscillatory excursions for a selected delay period within the range from zero to approximately two and one-half seconds. Knob 195 is the power switch to the oscillator control.

Power for all of the electrically powered components discussed above is coupled through master power switch 196. Indicator lamp 198 is coupled to switch 196 for providing visual verification whenever power is supplied to the components of control panel 152. Coupled in line with switch 196 are a pair of slow-blow fuses 200 and 202, typically on the order of ten amps, for protecting the electrically powered control devices described above.

Switch 204 is coupled to, and controls the operation of the solid state timer (not shown) discussed above. By activating switch 180, the solid state timer automatically initiates the weld, controls the flow of shield gas and controls the welding wire and hard metal feed mechanisms 42 and 44, respectively.

2. THE METHOD

Referring to FIGS. 1 and 8, drill collars 18 requiring maintenance are stored on pipe racks 20 as illustrated at position 206. The first step which must be performed to prepare the drill collars for hardbanding is to visually inspect each collar and its tool joints for cracks or other structural defects. The area at which the hardband is to be applied must also be inspected to determine whether or not the metal of the drill collar is capable of accepting the hardband. For example, due to alloying it is sometimes difficult to apply a new hardband that will securely adhere to a point on the drill collar that has been hardbanded previously.

After the visual inspection is complete, the drill collar is moved to position 208 where heater 51 is placed over the collar and is activated so as to heat the area on which the hardband is to be applied to a temperature within the range of 440° F. to 501° F., and preferably to a temperature of approximately 450° F. Heater 51 is fueled by propane cylinder 52, and preferably operates at approximately 120 pounds of pressure per square inch so as to produce a hot, blue flame. By preheating drill collar 18, the application of the hardbands and the high temperature associated therewith present less of a shock to the molecular structure of the metal of the drill collar, thereby reducing the possibility of metal fatigue through crystallization of the drill collar. Moreover, heating the drill collar aids in burning off oil residue, or any other contaminants which may be present on the area to be hardbanded.

After removing heater 51, the area to be hardbanded is buffed with a cup brush (not shown) and a grinder (not shown) to remove a very thin layer of metal as well as any impurities which may still be present after heating. The removal of the thin layer of metal also provides a clean metal surface essentially free of oxidation products.

The drill collar, having been visually inspected, heated and buffed, is ready to be coupled to the mandril in preparation for the application of the hardband. Joinder of drill collar 18 to the mandril is accomplished by rolling the drill collar along pipe racks 20 until it is directly above pipe jacks 22 and 23. The drill collar is then lifted off the pipe racks 20 by, and supported on pipe jacks 22 and 23 which the operator controls through hydraulic controls 156 and 157. If the drill collar and the mandril are on approximately the same level, the drill collar can be translated axially on the transfer balls 25 of pipe jacks 22 and 23 until the end of the drill collar engages mandril 58 (see FIG. 4).

Typically, the height of the mandril 58 must also be adjusted before the mandril 58 and the drill collar 18 are aligned sufficiently for joinder. This is accomplished by use of torch/mandril elevation assembly 35 which is controlled by the operator through hydraulic control 158. Through the use of pipe jacks 22 and 23 and the torch/mandril elevation assembly 35, the drill collar and the mandril can be brought to essentially the same level and rigidly coupled together.

Drill collar 18 may be coupled to the mandril either by rotating the drill collar on transfer balls 25 of pipe jacks 22 and 23 with the use of a pipe wrench (not shown), or mandril 58 may be rotated into the drill collar 18 by operating hydraulic control 154 or control 155.

When working in an area where pipe jacks 22 and 23 are directly supported by the ground, it is not uncommon for the pipe jacks 22 and 23 to sink into the ground under the weight of the drill collar, possibly allowing the drill collar to fall to the ground. The likelihood of occurrence of this problem is greatly increased due to the vibrations and other changing forces applied to the jacks 22 and 23 while translating the drill collars axially on the transfer balls 25 of the pipe jacks 22 and 23 during the mandril coupling process. An alternative method for coupling the drill collar 18 to the mandril 58 is to pull truck 12 forward, roll drill collar 18 to a position above the pipe jacks 22 and 23, lift the drill collar 18 by use of the pipe jacks 22 and 23, and back up truck 12 until the mandril 58 engages the drill collar 18. This effectively eliminates the need to move the drill collars axially on the pipe jacks, and thus provides for safer operation.

After the drill collar 18 has been rigidly coupled to the mandril 58, the placement of the torch 60 must be adjusted. By operating toggle switch 174, the welding wire extending from torch 60 can be brought very close to the drill collar for ease in positioning torch 60. The position of torch 60 can be adjusted through oscillator 90 and by rotating handle 102. The operator can manually activate oscillator 90 through control knob 195, and can adjust the center point and width of oscillation through control knobs 190 and 192, respectively. If further adjustment is necessary, handle 102 can be rotated so as to move the oscillator to the desired position relative to the drill collar.

If the position of the area to be hardbanded lies outside the range of the adjustments described above (i.e., if the area to be hardbanded is located outside of housing 54 when the drill collar is coupled to the mandril), torch assembly 32 and shaft 110 can be detached from the mandril assembly 30 (see FIG. 4). This is accomplished by suspending torch assembly 32 from boom 17 (see FIG. 1) through the use of chains (not shown). Once the weight of torch assembly 32 is supported by boom 17, torch assembly 32 can be translated away from mandril assembly 30 whereby shaft 110 simply slides out of yoke 112 of the mandril assembly. Once shaft 110 is uncoupled from yoke 112, torch assembly 32 can be moved outwardly along boom 17 to the point at which the hardband is to be applied.

Once the torch assembly 32 is positioned in the proper location, the application of the hardband may proceed. In accomplishing this the operator first initiates rotation of the mandril 58 and the drill collar 18 by use of hydraulic control 154, and he then turns on the oscillator by means of control knob 195. The operator then double-checks the setting of the feed rates by use of controls 178 and 172, after which he flips the master weld switch 204 which causes the solid state timer to initiate automatic control of the flow of shield gas, the wire feed mechanism 42, the alternator 24 and the hard metal feed mechanism 44.

As soon as the operator places the master weld switch 204 in the on position, or by manually operating switch 205 solenoid gas test switch, the solid state timer opens the gas solenoid valve 50 allowing shield gas to flow from supply 48, thus setting up an inert gas shield around the area to be hardbanded. After approximately one to two seconds, the solid state timer automatically activates wire feed mechanism 42 which advances the welding wire through torch 60 toward the drill collar 18. As soon as the welding wire touches the drill collar 18, master weld power is delivered through conductor 66 to the welding wire which then strikes an arc and begins the application of the hardband. Essentially simultaneously, the solid state timer activates hard metal feed mechanism 44.

After the hardbander applies one complete band (i.e., one revolution of the drill collar during the application of the hardband), the operator can perform a step-over maneuver by adjusting the center point of oscillator 90 by means of control knob 190, thereby beginning a second hardband. This process may be continued until the desired number of hardbands are completed. Typically, five one-inch wide metal bands are applied, one immediately adjacent another, so as to produce an essentially continuous, five-inch wide hardband.

After the desired number of bands have been completed, the operator simply places the master weld switch 204 in the off position whereupon the solid state timer immediately shuts down the welding wire and hard metal feed mechanisms 42 and 44, and decouples master weld power from the torch 60. The argon gas continues to flow for approximately one to two seconds after which the solenoid gas valve 50 is automatically closed by the solid state timer. It will, of course, be apparent that the time delays performed by the solid state timer may be adjusted as conditions dictate.

After the application of the hardband has been completed, drill collar 18 is uncoupled from mandril 58 either by rotating the drill collar relative to the mandril, or by rotating the mandril relative to the drill collar in such a manner so as to disengage the drill collar from the mandril. Following disengagement, drill collar 18 is lowered to pipe racks 20 through the use of pipe jacks 22 and 23, and the newly hardbanded area is wrapped in an insulating material (not shown). The insulating material causes the newly hardbanded area to cool at a relatively slow rate which increases the structural strength and the durability of the hardband.

The invention may be embodied in other specific forms without departing from its spirit or esential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for welding a metal band onto a drill string section comprising in combination:
    an electrical power source;
    a welding torch assembly electrically coupled to the power source;
    means for supporting the drill string section;
    means for securely engaging a portion of the drill string section;
    means for rotating the engaging means and the drill string section;
    means for elevating the drill string section;
    means for elevating the torch assembly, the engaging means and the rotating means;
    means for oscillating the welding torch assembly so as to produce a metal band having a predetermined width; and
    means for supporting and transporting the power source, the welding torch assembly, the engaging means, the rotating means and the elevating means, wherein said means for transporting also provides support for portions of the drill string section during welding of said drill string section.

2. An apparatus for welding a metal band onto a drill string section as defined in claim 1 further comprising means for displacing the welding torch assembly along a substantial portion of the drill string section.

3. An apparatus for welding a metal band onto a drill string section as defined in claim 2 further comprising means for dissipating heat from the torch assembly.

4. An apparatus for welding a metal band onto a drill string section as defined in claim 3 further comprising a hydraulic power source.

5. An apparatus for welding a metal band onto a drill string section comprising in combination:
    an electrical power source;
    a welding torch assembly electrically coupled to the power source, said welding torch assembly being slidably positionable upon a substantial portion of the drill string section;
    means for supporting the drill string section;
    a mandril having a complimentary engaging portion for engaging one end of the drill string section;
    means for rotating the mandril and the drill string section;
    means for elevating the drill string section;
    means for elevating the torch assembly, the mandril and the rotating means; and
    means for oscillating the torch assembly so as to produce a metal band having a predetermined width.

6. An apparatus for welding a metal band onto a drill string section as defined in claim 5 further comprising means for transporting the power source, the torch assembly, the engaging means, the rotating means, the elevating means and the oscillatory means, wherein said means for transporting also provides support for portions of the drill string section during welding.

7. An apparatus for welding a metal band onto a drill string section as defined in claim 6 further comprising means for dissipating heat from the torch assembly.

8. An apparatus for welding a metal band onto a drill string section as defined in claim 6 further comprising a hydraulic power source.

9. An apparatus for welding a metal band onto a drill string section as defined in claim 8 further comprising means for automatically controlling the electrical power source, the torch assembly and the oscillating means.

10. An apparatus for welding a metal band onto a drill string section as defined in claim 9 wherein the electrical power source comprises a diesel-powered alternator.

11. An apparatus for welding a metal band onto a drill string section as defined in claim 9 wherein the welding torch assembly comprises a conventional metal-inert-gas welding torch assembly.

12. An apparatus for welding a metal band onto a drill string section as defined in claim 11 wherein the conventional metal-inert-gas torch assembly comprises:
   a welding torch;
   a welding wire feed mechanism for feeding welding wire to the welding torch;
   a hard metal feed mechanism for feeding pulverized hard metal to the welding torch; and
   a supply of inert shield gas coupled to the welding torch.

13. An apparatus for welding a metal band onto a drill string section as defined in claim 9 wherein the supporting means comprises a pair of hydraulic jacks having transfer balls for supporting the drill string section so as to allow axial translation and rotation of the drill pipe relative to the jacks, the height of the jacks being adjustable.

14. An apparatus for welding a metal band onto a drill string section as defined in claim 9 wherein the mandril comprises one or more interchangeable mandrils, each said mandril configured so as to provide a complementary threaded portion for rigidly engaging at least one end of at least one specific size of drill string section.

15. An apparatus for welding a hardened metal band onto a drill string section as defined in claim 14 wherein the interchangeable mandrils comprise:
   one or more mandrils of various sizes, each said mandril having a male threaded portion and being configured to engage the box end of specific size of drill string section; and
   one or more mandrils of various sizes, each said mandril having a female threaded portion and being threaded to engage the pin ends of a specific size of drill string section.

16. An apparatus for welding a metal band onto a drill string section as defined in claim 9 wherein the rotating means comprises a reversible hydraulic motor coupled to the engaging means, said hydraulic motor deriving its power from the hydraulic power source.

17. An apparatus for welding a metal band onto a drill string section as defined in claim 9 wherein the means for elevating the torch assembly comprises:
   a plurality of essentially parallel, rigid guide posts;
   a continuous screw oriented essentially parallel to the guide posts;
   a support arm having a plurality of annular fittings configured to receive the guide posts in mating relationship and having a threaded annular coupling configured to receive the continuous screw in mating relationship, the support arm being rigidly coupled to the rotating means and to the torch assembly; and
   a reversible hydraulic motor rigidly coupled to one end of the continuous screw, the hydraulic motor deriving its power from the hydraulic power source.

18. An apparatus for welding a metal band onto a drill string section as defined in claim 9 wherein the oscillating means further comprises means for adjusting the placement of the torch assembly relative to the drill string section.

19. An apparatus for welding a metal band onto a drill string section as defined in claim 18 wherein the oscillating means and the placement adjusting means comprises an electro-mechanical position control system.

20. An apparatus for welding a metal band onto a drill string section as defined in claim 9 wherein the transporting means comprises a conventional truck having the power source, the torch assembly, the engaging means, the rotating means and the elevating means rigidly mounted on its bed, said truck also providing support for portions of the drill string during the welding process.

21. An apparatus for welding a metal band onto a drill string section as defined in claim 7 wherein the heat dissipating means comprises:
   a water reservoir; and
   an electric pump coupled between the water reservoir and the torch assembly for circulating water through the torch assembly, the pump deriving its power from the high voltage power source.

22. An apparatus for welding a metal band onto a drill string section as defined in claim 9 wherein the hydraulic power source comprises a conventional hydraulic pump, the hydraulic pump being shaft driven by the diesel engine of the alternator.

23. An apparatus for welding a metal band onto a drill string section as defined in claim 9 wherein the controlling means comprises an electric solid state timer coupled to the electrical power source, the torch assembly and the oscillating means.

24. An apparatus for welding a metal band onto a drill string section comprising in combination:
   a welding assembly comprising:
      a diesel-powered alternator;
      a metal-inert-gas welding torch coupled to the alternator, said welding torch being slidably positionable upon a substantial portion of the drill string section;
      an electro-mechanical position control system coupled to the welding torch for (1) adjusting the position of the torch relative to the drill string section, and (2) for oscillating the torch so as to produce a hardband having a predetermined width;
      a water cooling system coupled to the torch assembly in heat transfer relation, the water cooling system deriving its power from the alternator;
      a hydraulic pump shaft driven by the diesel engine of the alternator;
   a rotational drive assembly having a hydraulic motor coupled to the hydraulic pump and driving a mandril configured to rididly engage a portion of the drill string section;
   an elevation assembly having a hydraulic motor coupled to the hydraulic pump, said elevation assembly being rigidly coupled to the torch assembly and to the rotational drive assembly, so as to permit elevation of said torch and said rotational drive assemblies;
   hydraulic jacks coupled to the hydraulic pump for elevating and supporting the drill pipes, each hydraulic jack having transfer balls so as to facilitate axial translation and rotation of the drill pipe relative to the jacks;

means for transporting the welding assembly, wherein the transporting means provides support for portions of the drill string during welding of the drill string section;

a boom connected to the transporting means and extendible above the drill string section for supporting the welding assembly therefrom; and means movably secured to the boom and connectable to the welding torch assembly for supporting said welding torch assembly adjacent the drill string section, and for positioning the welding torch assembly adjacent a selected position on the drill string section.

25. An apparatus for welding a metal band onto a drill string section as defined in claim 2 further comprising means for supporting the welding torch assembly adjacent the drill string section, said torch assembly supporting means providing for displacment of the supported welding torch assembly along a substantial portion of the drill string section.

26. An apparatus for welding a metal band onto a drill string as defined in claim 25 wherein the torch assembly supporting means comprises:

a boom which is secured to the transporting means and is extendible above the drill string section such that the welding torch assembly may be supported therefrom; and means movably secured to the boom and connectable to the welding torch assembly for supporting said welding torch assembly adjacent the drill string section, and for positioning the welding torch assembly adjacent a selected position on the drill string section.

27. An apparatus for welding a metal band onto a drill string as defined in claim 26 wherein the means movably secured to the boom for supporting the welding torch assembly comprises at least one chain.

28. An apparatus for welding a metal band onto a drill string section as defined in claim 6 further comprising means for supporting the welding torch assembly adjacent the drill string section, said torch assembly supporting means providing for displacement of the supported welding torch assembly along a substantial portion of the drill string section.

29. An apparatus for welding a metal band onto a drill string as defined in claim 28 wherein the torch assembly supporting means comprises:

a boom which is secured to the transporting means and is extendible above the drill string section such that the welding torch assembly may be supported therefrom; and means movably secured to the boom and connectable to the welding torch assembly for supporting said welding torch assembly adjacent the drill string section, and for positioning the welding torch assembly adjacent a selected position on the drill string section.

30. An apparatus for welding a metal band onto a drill string as defined in claim 29 wherein the means movably secured to the boom for supporting the welding torch assembly comprises at least one chain.

* * * * *

UNITED STATES PATENT AND TRADEMARK OFFICE
CERTIFICATE OF CORRECTION

PATENT NO. : 4,431,902
DATED : February 14, 1984
INVENTOR(S) : H. Bruce Wallen

It is certified that error appears in the above—identified patent and that said Letters Patent is hereby corrected as shown below:

Column 3, line 30, please delete "not"

Column 12, line 44, "ounces" should be --inches--

Column 12, line 46, "ounces" should be --inches--

Column 15, line 8, "172" should be --182--

Column 17, line 41 (in claim 15), "of specific" should be --of a specific--

Column 19, line 20, (in claim 25), "displacment" should be --displacement--

Signed and Sealed this

Tenth Day of July 1984

[SEAL]

Attest:

Attesting Officer

GERALD J. MOSSINGHOFF

Commissioner of Patents and Trademarks